(12) United States Patent
Gutierrez

(10) Patent No.: US 10,162,194 B2
(45) Date of Patent: Dec. 25, 2018

(54) EYE MOUNTABLE DEVICE AND FLEXIBLE ASSEMBLY FOR FABRICATION THEREOF

(71) Applicant: Verily Life Sciences LLC, Mountain View, CA (US)

(72) Inventor: Christian Gutierrez, Santa Clara, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 119 days.

(21) Appl. No.: 15/058,064

(22) Filed: Mar. 1, 2016

(65) Prior Publication Data
US 2017/0255025 A1    Sep. 7, 2017

(51) Int. Cl.
| B29D 11/00 | (2006.01) |
| G02C 7/04 | (2006.01) |
| G02C 7/08 | (2006.01) |
| G02C 7/02 | (2006.01) |

(52) U.S. Cl.
CPC ........ *G02C 7/083* (2013.01); *B29D 11/00038* (2013.01); *B29D 11/00048* (2013.01); *B29D 11/00807* (2013.01); *G02C 7/021* (2013.01); *G02C 7/04* (2013.01); *G02C 7/049* (2013.01)

(58) Field of Classification Search
CPC .................................................. G02C 7/083
See application file for complete search history.

(56) References Cited

U.S. PATENT DOCUMENTS

| 4,994,082 A | 2/1991 | Richards et al. |
| 5,724,187 A * | 3/1998 | Varaprasad ............. B32B 17/06 359/265 |
| 6,195,807 B1 | 3/2001 | Chou |
| 8,043,464 B2 | 10/2011 | Kim et al. |
| 8,453,314 B2 | 6/2013 | Viscarra et al. |
| 8,523,354 B2 | 9/2013 | Haddock et al. |

(Continued)

FOREIGN PATENT DOCUMENTS

| EP | 2848983 A2 | 3/2015 |
| WO | 2007/037690 B2 | 4/2007 |

(Continued)

OTHER PUBLICATIONS

PCT/US2017/017962—International Search Report and Written Opinion of the International Searching Authority dated May 26, 2017, 9 pages.

*Primary Examiner* — Nathanael R Briggs
*Assistant Examiner* — Alexander Gross
(74) *Attorney, Agent, or Firm* — Christensen O'Connor Johnson Kindness PLLC

(57) ABSTRACT

Techniques and mechanisms for fabrication of an eye mountable device. In an embodiment, an apparatus includes two curved lens portions and a flexible arm structure that extends between, and is anchored to, each of the two curved lens portions. The eye mountable device is formed at least in part by manipulation of the curved lens portions using the arm structure. Flexibility of the arm structure accommodates positioning of one curved lens portion to overlap the other curved lens portion. A lens of the eye mountable device is formed by the curved lens portions. In another embodiment, an enclosure formed by the lens has disposed therein an accommodation actuator.

13 Claims, 7 Drawing Sheets

(56) References Cited

U.S. PATENT DOCUMENTS

| | | | |
|---|---|---|---|
| 8,777,408 B2* | 7/2014 | Kurtin | G02C 7/085 |
| | | | 351/159.68 |
| 2008/0208335 A1 | 8/2008 | Blum et al. | |
| 2010/0225834 A1* | 9/2010 | Li | G02C 7/08 |
| | | | 349/13 |
| 2011/0113619 A1 | 5/2011 | Viscarra et al. | |
| 2014/0084489 A1 | 3/2014 | Etzkorn | |
| 2014/0268026 A1 | 9/2014 | Pugh et al. | |
| 2014/0276481 A1 | 9/2014 | Pugh et al. | |

FOREIGN PATENT DOCUMENTS

| WO | WO2014202678 | 12/2014 |
|---|---|---|
| WO | 2015/191247 A1 | 12/2015 |

\* cited by examiner

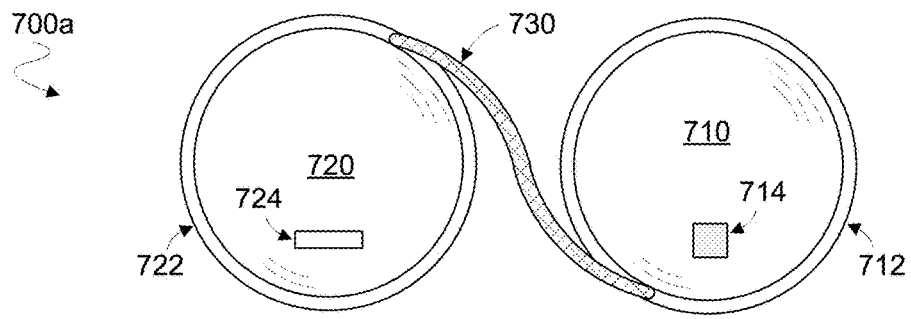
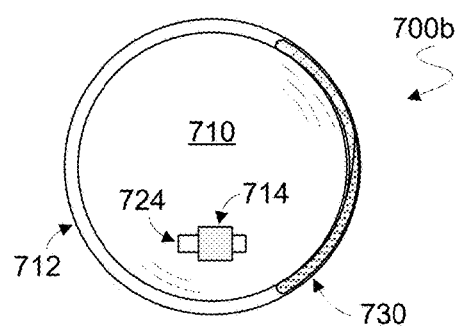
FIG. 7
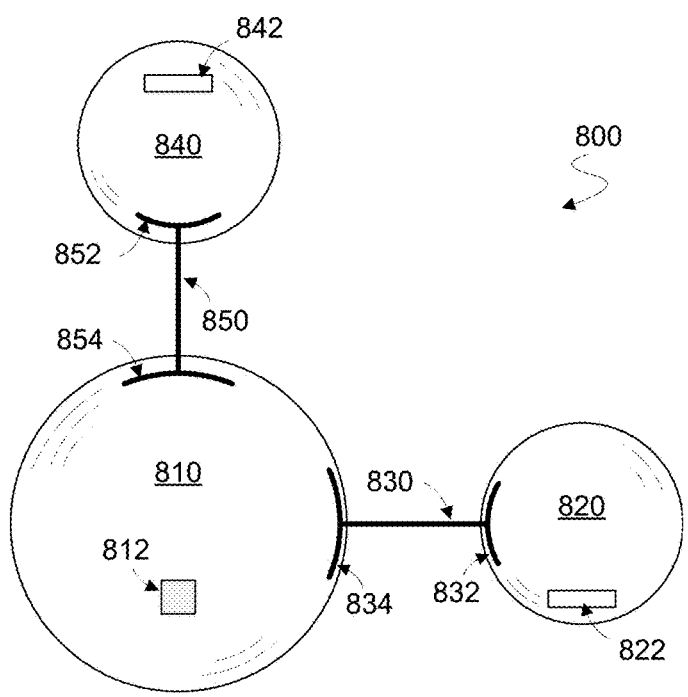
FIG. 8

EYE MOUNTABLE DEVICE AND FLEXIBLE ASSEMBLY FOR FABRICATION THEREOF

BACKGROUND

1. Technical Field

This disclosure relates generally to the field of optics, and in particular but not exclusively, relates to contact lenses.

2. Background Art

Accommodation is a process by which the eye adjusts its focal distance to maintain focus on objects of varying distance. Accommodation is a reflex action, but can be consciously manipulated. Accommodation is controlled by contractions of the ciliary muscle. The ciliary muscle encircles the eye's elastic lens and applies a force on the elastic lens during muscle contractions that change the focal point of the elastic lens.

As an individual ages, the effectiveness of the ciliary muscle degrades. Presbyopia is a progressive age-related loss of accommodative or focusing strength of the eye, which results in increased blur at near distances. This loss of accommodative strength with age has been well studied and is relatively consistent and predictable. Presbyopia affects nearly 1.7 billion people worldwide today (110 million in the United States alone) and that number is expected to substantially rise as the world's population ages. Techniques and devices that can help individuals offset the effects of Presbyopia are increasingly in demand.

BRIEF DESCRIPTION OF THE DRAWINGS

The various embodiments of the present invention are illustrated by way of example, and not by way of limitation, in the figures of the accompanying drawings and in which:

FIG. 7 shows top views of a process to fabricate an eye-mountable device according to an embodiment.

FIG. 8 shows a top view an apparatus for fabrication of an eye-mountable device according to an embodiment.

DETAILED DESCRIPTION

Figure 1:
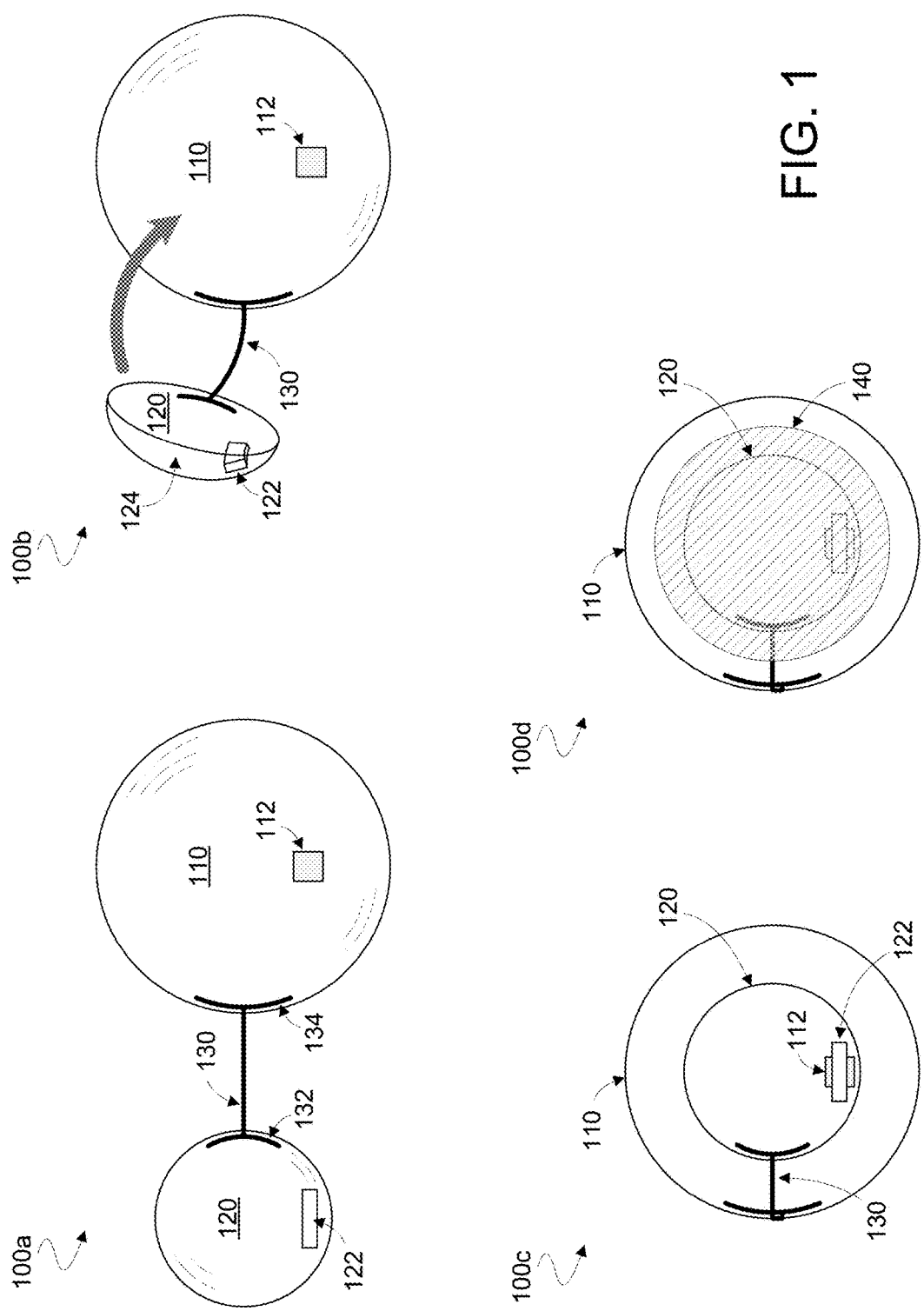
FIG. 1 shows top views of a process to fabricate an eye-mountable device according to an embodiment.

Embodiments described herein variously provide an eye-mountable device (or "EMD") and/or techniques or mechanisms for fabrication of such an EMD. In the following description numerous specific details are set forth to provide a thorough understanding of the embodiments. One skilled in the relevant art will recognize, however, that the techniques described herein may be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein are various techniques and mechanisms to facilitate fabrication of a smart contact lens or other eye-mountable device by folding, twisting or otherwise manipulating lens portions that are flexibly coupled to one another. Certain embodiments variously avoid or otherwise mitigate problems associated with assembling separate circuit and/or optical structures to form a contact lens. Conventional techniques for forming an accommodation lens typically include stacking separate lens structures with one another. Establishing electrical connection between respective conductors disposed on separate rigid planes usually requires the use of an intermediary material such as a connector and/or a conductive adhesive. The use of standard connective approaches can be inefficient in terms of the size of the resulting device, the number of process steps, process yield and/or the like. Certain embodiments variously mitigate such inefficiencies with the use of an integrated device comprising optics structures that are flexibly connected to one another. Flexible connection may be provided by a structure including one or more foldable electrical connections that facilitate, in a thin form factor suitable for encapsulation within a contact lens, monolithic electrical contact between a dynamic optic element and external electronics.

Certain features of various embodiments are described herein with reference to fabrication of an EMD that provides an automatic accommodation functionality. However, such discussion may be extended to additionally or alternatively apply to the fabrication, according to different embodiments, of an EMD that provides other functionality. In one embodiment, an EMD comprises an electrically activated lens including an accommodation actuator for adjusting the focal distance of the contact lens. In some embodiments, accommodation is automatically adjusted in real-time based upon a user's gazing direction. The accommodation actuator may be disposed in a center region of the smart contact lens (e.g., covering at least the foveal vision). As such, it may be desirable that structures and/or fabrication processes aid in the positioning of an accommodation actuator—e.g., relative to electrodes and/or other circuitry that is to support operation of the accommodation actuator.

The accommodation actuator may be implemented with a layer of liquid crystal (LC) material, and may require electrodes to electronically control the accommodation actuator. Accordingly, electrical, structural and/or other isolation may need to be provided—e.g., between the electrodes or between the liquid crystal and control circuitry of the EMD. Embodiments of the instant disclosure mitigate drawbacks that, for example, are associated with conventional techniques for electrically coupling respective circuitry on separate lens structures.

Certain embodiments variously allow for at least part of an accommodation actuator (e.g., including a LC material and adjoining layers of polyimide or other alignment material) to be disposed on a surface of a structure—referred to herein as a curved lens portion—that is to form at least part of a lens. Such a curved lens portion may be subsequently overlapped with another curved lens portion to form at least in part a lens, where the accommodation actuator is surrounded by the lens, and sealed in an enclosure that is formed by the lens. Although the material of the lens may be distinguished from the sealed enclosure formed by the lens, the lens and enclosure may be referred to collectively as a "lens enclosure".

Embodiments of the eye-mountable device may include a power supply, control electronics, an accommodation actuator, a gaze direction sensor system, and/or an antenna embedded within an enclosure in a lens that is formed to be contact mounted to an eye (e.g., shaped to be removeably mounted to a cornea and allow eyelid motion to open and close). In one embodiment, the control electronics are coupled to monitor the sensor system to identify gaze direction/focal distance, manipulate the accommodation actuator to control the optical power of the eye-mountable device, and provide wireless communications with an external reader. In some embodiments, the power supply may include charging circuitry for controlling inductive wireless charging of an embedded battery.

The lens may be fabricated from any of a variety of biocompatible materials suitable for direct contact with a human eye, such as a polymeric material, a hydrogel, PMMA, silicone based polymers (e.g., fluoro-silicon acrylate), or otherwise. The electronics may be disposed upon a substrate—e.g., having a ring shape—embedded within the enclosure near a periphery of the lens to avoid interference with incident light received closer to the central region of the cornea. A sensor system may be arranged on the substrate to face outward towards the eyelids to detect the gaze direction/focal distance based upon the amount and position of eyelid coverage over the sensor system. As the eyelids cover different portions of the sensor system, this changes a characteristic (e.g., its capacitance), which may be measured to determine gaze direction and/or focal distance.

In some embodiments, the gaze direction/focal distance information may then be used to determine the amount of accommodation to be applied via a see-through accommodation actuator positioned in a central portion of the enclosure formed by the lens. The accommodation actuator may be coupled to the controller to be electrically manipulated thereby via the application of a voltage across a pair of electrodes. For example, the accommodation actuator may be implemented with a LC cell that changes its index of refraction in response to an applied electrical bias signal across the electrodes. In other embodiments, the accommodation actuator may be implemented using other types of electro-active materials such as electro-optic materials that vary refractive index in the presence of an applied electric field or electro-mechanical structures that change the shape of a deformable lens. Other example structures that may be used to implement the accommodation actuator include electro-wetting optics, micro-electro-mechanical systems, or otherwise.

Certain embodiments are not limited with respect to a particular flexibility/rigidity of the eye-mountable device and/or a particular mechanism (e.g., LC element or other) by which an accommodation actuator changes an optical strength of the device. Furthermore, some embodiments are not limited with respect to a capacitive gaze tracking, photodetector gaze tracking of other technique that may be used to determine whether a change in optical strength is to take place.

FIG. 1 shows various stages 100*a*, 100*b*, 100*c*, 100*d* of processing to fabricate an EMD according to an embodiment. Such fabrication may include one or more operations to fold, twist and/or otherwise manipulate a device which includes two or more curved lens portions and an arm structure that extends between—and may be anchored to each of—various ones of the two or more curved lens portions. Such a device may include structures that are variously disposed in or on respective ones of the curved lens portions and the arm structure. For example, circuitry of the device may include a continuous flexible electronic assembly (CFEA) that spans multiple lens portions and the arm structure.

As shown in stage 100*a*, a device according to one embodiment may include curved lens portions 110, 120 and an arm structure 130 extending between curved lens portions 110, 120. Flexibility of arm structure 130 may facilitate positioning of curved lens portions 110, 120 to form at least part of a lens—e.g., a composite lens—of an EMD. For example, curved lens portions 110, 120 may each include a respective light transmissive material such as any of a variety of materials used in conventional contact lenses. Some examples of a light transmissive material of curved lens portions 110, 120 include, but are not limited to, PMMA, polyurethane, silicone based polymers, Parylene, polyimide, PET and various other polymers (or other materials) currently used to form rigid or semi-rigid contact lenses.

Arm structure 130 may extend between a location at or near a periphery of curved lens portion 110 and another location at or near a periphery of curved lens portion 120. Anchoring of arm structure 130 to curved lens portions 110, 120 may be due to arm structure 130 including or coupling to structures that are variously disposed in, or bonded onto, respective ones of curved lens portions 110, 120. By way of illustration and not limitation, distal ends of arm structure 130 may include or couple to respective branch structures 132, 134 that are rigidly coupled each to a respective one of curved lens portions 110, 120. Branch structures 132, 134 may, for example, be adhered or otherwise bonded each to a surface of a respective curved lens portion. Alternatively or in addition, one or each of branch structures 132, 134 may be disposed within a curved lens portion—e.g., during deposition, curing etc. of a light transmissive material of that curved lens portion. In some embodiments, arm structure 130 extends between ring structures (not shown) that are each disposed on or within a respective one of curved lens portions 110, 120.

Arm structure 130 may include a flexible material that, for example, is light transmissive. In one embodiment, arm structure 130 comprises a hydrogel (e.g., silicone hydrogel) and/or any of various materials adapted, for example, from conventional techniques for fabricating flexible contact lenses. Some examples of flexible material of arm structure 130 include, but are not limited to Parylene, polyimide, PET and silicone based polymers. Arm structure 130 may additionally or alternatively comprises flexible circuitry—e.g., including one or more signal traces—that provides for interconnection between elements variously disposed in or on respective ones of curved lens portions 110, 120. For example, signal traces may extend in or on a hydrogel or other light transmissive material of arm structure 130.

A flexibility of arm structure 130 may be greater than that of curved lens portion 110 and/or that of curved lens portion 120. Such flexibility may allow for movement of curved lens portion 110 relative to curved lens portion 120—e.g., wherein one of curved lens portions 110, 120 is moved to overlap at least some of the other of curved lens portions 110, 120. Although curved lens portion 110 is shown as being larger than curved lens portion 120, certain embodiments are not limited in this regard.

As shown in stages 100b, 100c, manipulation of curved lens portions 110, 120 may result in a structure 112—formed in or on curved lens portion 110—being aligned with or otherwise overlapped by another structure 122 that is formed in or on curved lens portion 120. Such structures may include one or more electrodes or other circuitry, a liquid crystal cell and/or any of various other elements that, for example, are to comprise a smart contact lens or other such EMD. Alternatively or in addition, structures 112, 122 may include part of a lip or a groove that, for example, encircles or otherwise defines an area at a surface of one of curved lens portions 110, 120.

In one embodiment, curved lens portions 110, 120 have variously disposed therein or thereon respective conductive layers each including one or more electrodes and/or other circuitry. Such circuitry—e.g., comprising indium tin oxide, silver nanowires, metal mesh, carbon nanotubes, graphene and/or the like—may be transparent to a user of the EMD that is to be formed. Formation of circuitry on a curved lens portion may include spray coating, evaporation deposition, sputtering, lamination and/or other operations adapted from conventional techniques, which are not detailed herein and are not limiting one certain embodiments.

Structures 112, 122 may be variously disposed on, or otherwise extend to, respective ones of a convex surface of curved lens portion 110 and a concave surface of curved lens portion 120. In such an embodiment, a convex surface 124 of curved lens portion 120 may face away from curved lens portion 110. Overlapping of curved lens portions 110, 120 may provide for electrical connection between structures 112, 122. Alternatively or in addition, electrical connection between structures 112, 122 (and/or between other structures variously formed in or on curved lens portions 110, 120) may be provided via circuitry formed in or on arm structure 130.

As shown in stage 100d, fabrication of an EMD according to an embodiment may further comprise deposition of an encapsulation material 140 over at least part of curved lens portions 110, 120. Encapsulation material 140 may include a polyimide, silicone, polyvinyl alcohol, hydrogel or any of various other light transmissive materials adapted, for example, from conventional techniques for providing a flexible contact lens. Encapsulation material 140 may seal some or all of an interface between curved lens portions 110, 120—e.g. to hold curved lens portion 110 and curved lens portion 120 in place relative to (e.g., adjacent to) one another. Encapsulation material 140 may thus aid in the formation of an enclosed region that facilitates the constraining and/or positioning of a LC cell or other accommodation mechanism of the EMD. Alternatively or in addition, encapsulation material 140 may function as an overcoat structure of a dynamic optic element—e.g., the overcoat structure to protect electrodes and/or an alignment layer that aids in alignment of liquid crystals.

Figure 2:
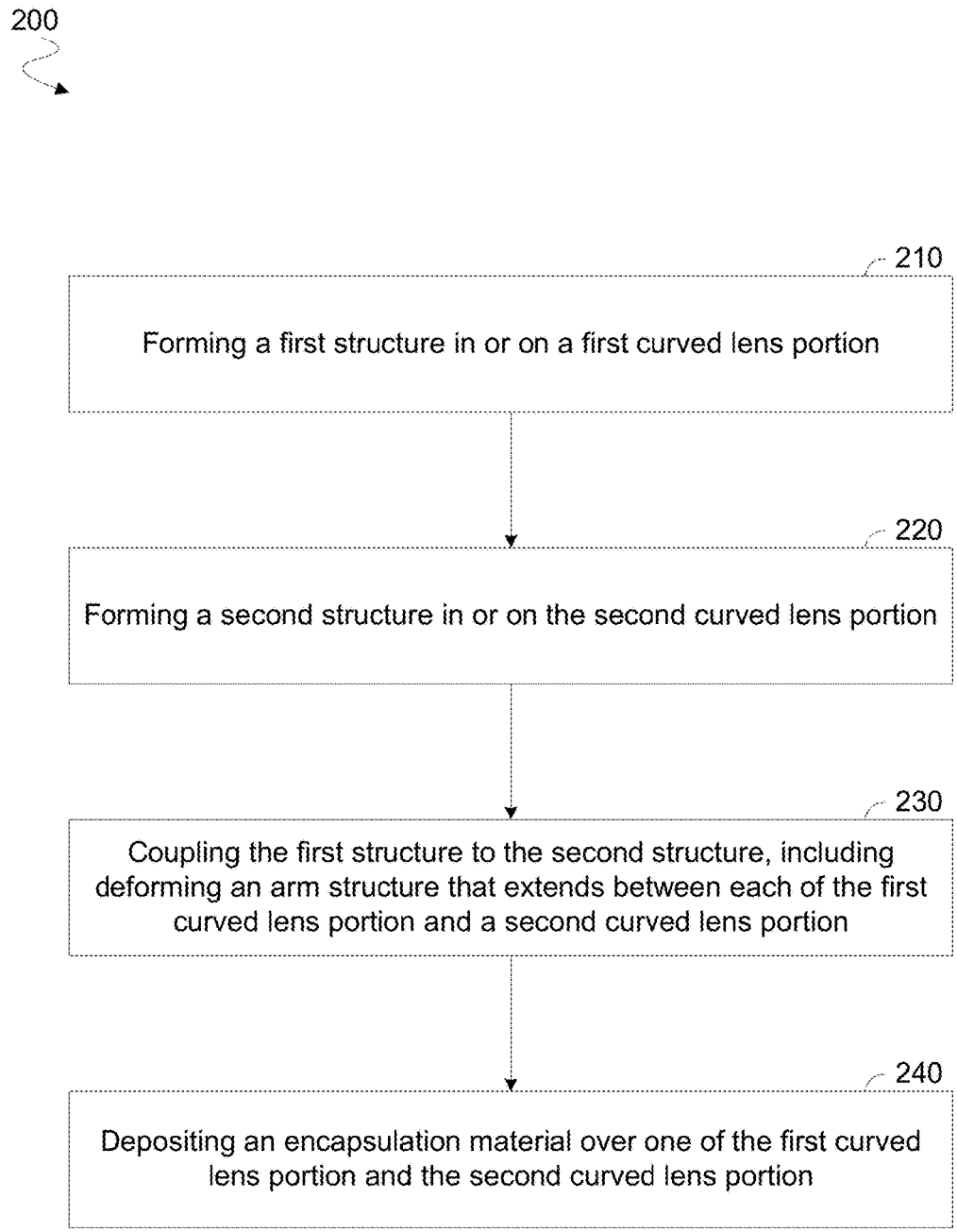
FIG. 2 is a flow diagram illustrating elements of a method for fabricating an eye-mountable device according to an embodiment.

FIG. 2 illustrates elements of a method 200 for fabricating an EMD according to an embodiment. Method 200 may include operations to manipulate a device—such as that shown in stage 100a of FIG. 1—which includes curved lens portions and a flexible arm structure that is anchored between two such curved lens portions. In one embodiment, method 200 results in the formation of an EMD comprising a LC cell (or other accommodation actuator mechanism).

Method 200 may include, at 210, forming a first structure in or on a first curved lens portion, wherein a first arm structure extends between (and, for example, is anchored to) each of the first curved lens portion and a second curved lens portion. Forming the first structure at 210 may include, for example, forming an electrode of a conductive layer that is deposited on the first curved lens portion. Alternatively or in addition, forming the first structure at 210 may include forming a lip or a groove that encircles a surface region of the first curved lens portion.

Method 200 may further comprise, at 220, forming a second structure in or on the second curved lens portion. The second structure may include an electrode or other circuitry that is to be electrically coupled to the first structure. Alternatively or in addition, the second structure may be configured to extend in or around the first structure—e.g., to aid in the positioning and/or constraining of a liquid crystal cell or other accommodation actuator mechanism.

In an embodiment, method 200 further comprises, at 230, coupling the first structure to the second structure, including deforming the first arm structure and overlapping the first curved lens portion with the second curved lens portion. Such deforming may include bending and/or twisting the arm structure—e.g., to align a center of the first curved lens portion with a center of the curved lens portion. In some embodiments, deforming the arm structure includes restraining movement of one of the first curved lens portion and the second curved lens portion during movement of the other of the first curved lens portion and the second curved lens portion. Such restraining may include applying a vacuum pressure to a curved lens portion. Alternatively or in addition, the restraining may include applying a mechanical restraint at a tab structure that extends from the first curved lens portion (e.g., where the tab structure is subsequently cut off of or otherwise removed from the first curved lens portion).

Although some embodiments are not limited in this regard, method 200 may further comprise one or more operations that aid in maintaining a position of the first curved lens portion relative to the second curved lens portion. By way of illustration and not limitation, method 200 may further comprise, at 240, depositing an encapsulation material over one of the first curved lens portion and the second curved lens portion. The depositing at 240 may seal an enclosure that, for example, includes an accommodation actuator and/or circuitry to operate such an accommodation actuator.

Figure 3:
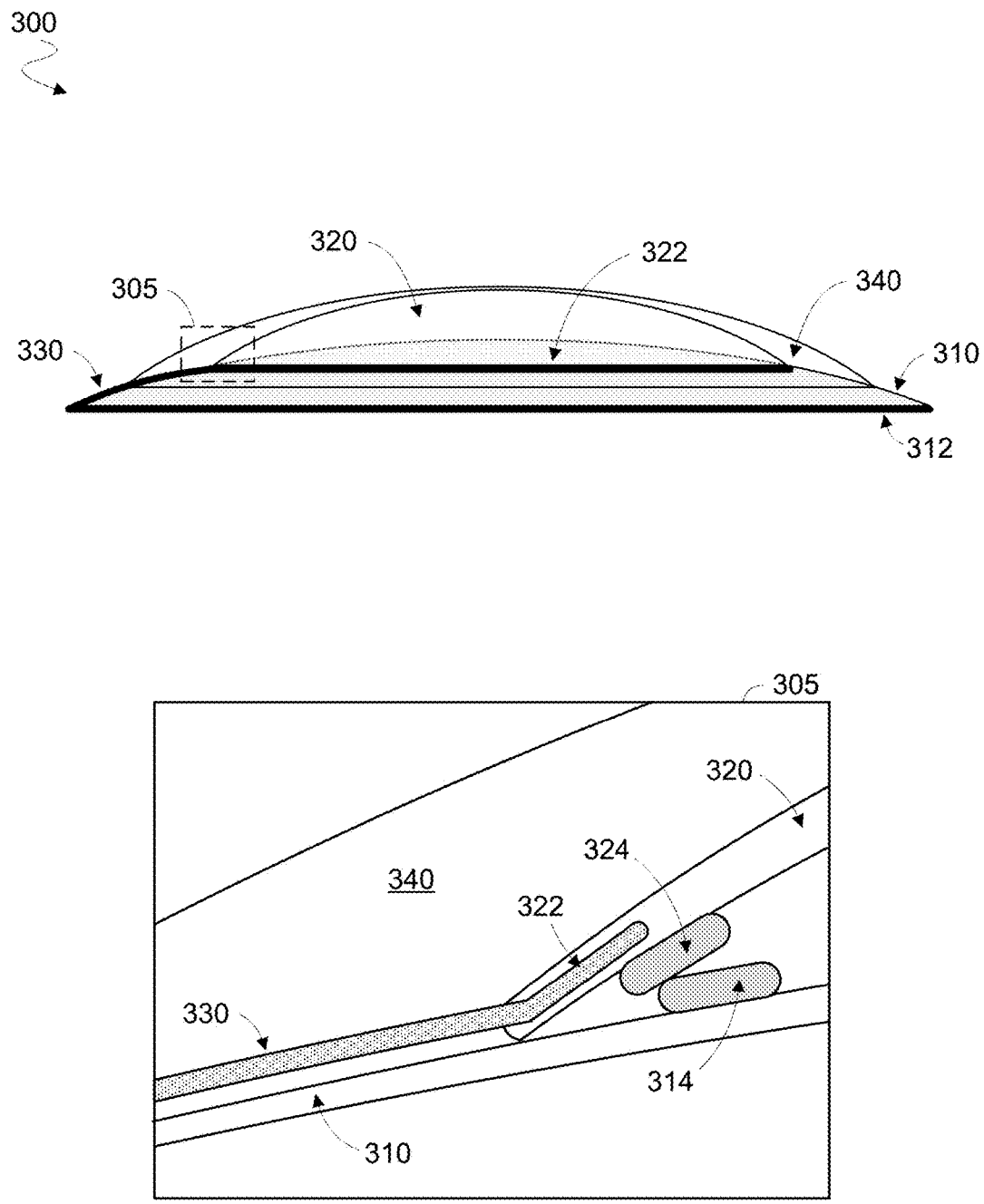
FIG. 3 is a side view illustration of an eye-mountable device, in accordance with an embodiment.

FIG. 3 illustrates elements of an EMD 300 formed from flexibly interconnected lens portions according to an embodiment. EMD 300 may be formed by the device such as that shown at stage 100a of FIG. 1, for example. In an embodiment, fabrication of EMD 300 includes some or all operations of method 200.

EMD 300 may include curved lens portions 310, 320 and a flexible arm structure 330 extending between curved lens portions 310, 320. By way of illustration and not limitation, ring structures 312, 322 may variously extend around respective peripheries of curved lens portions 310, 320, where arm structure 330 is coupled to each of ring structures 312, 322. A thickness and/or a material of ring structures 312, 322 may provide for relatively increased stiffness at or near a periphery of one (or each) of curved lens portions 310, 320. For example, one or each of ring structures 312, 322 may comprise a metal that is relatively inflexible, as compared to a light transmissive material of curved lens portions 310, 320. As shown in a detail view of region 305, a ring structure may be disposed within a curved lens portion, e.g., where arm structure 330 extends into a light transmissive material of curved lens portion 320 to couple to ring structure 322.

In FIG. 3, arm structure 330 has been deformed to provide for an overlapping of curved lens portions 310, 320. Deformation of arm structure 330 to overlap curved lens portions 310, 320 may result in contact between respective structures variously disposed in or on curved lens portions 310, 320. By way of illustration and not limitation, a structure 324 formed in or on curved lens portion 320 may be brought into contact with another structure 314 formed in or on curved lens portion 310. Structures 314, 324 may include electrodes that, for example, are to exchange a supply voltage, a control signal and/or the like. Alternatively or in addition, structures 314, 324 may aid in the forming of a sealed enclosure—e.g., to constrain or otherwise position a LC cell or other accommodation actuator mechanism of EMD 300. An encapsulation material 340 may be disposed over at least part of curved lens portions 310, 320 to aid in the formation of such a sealed enclosure and/or to protect other structures of EMD 300.

Figure 4:
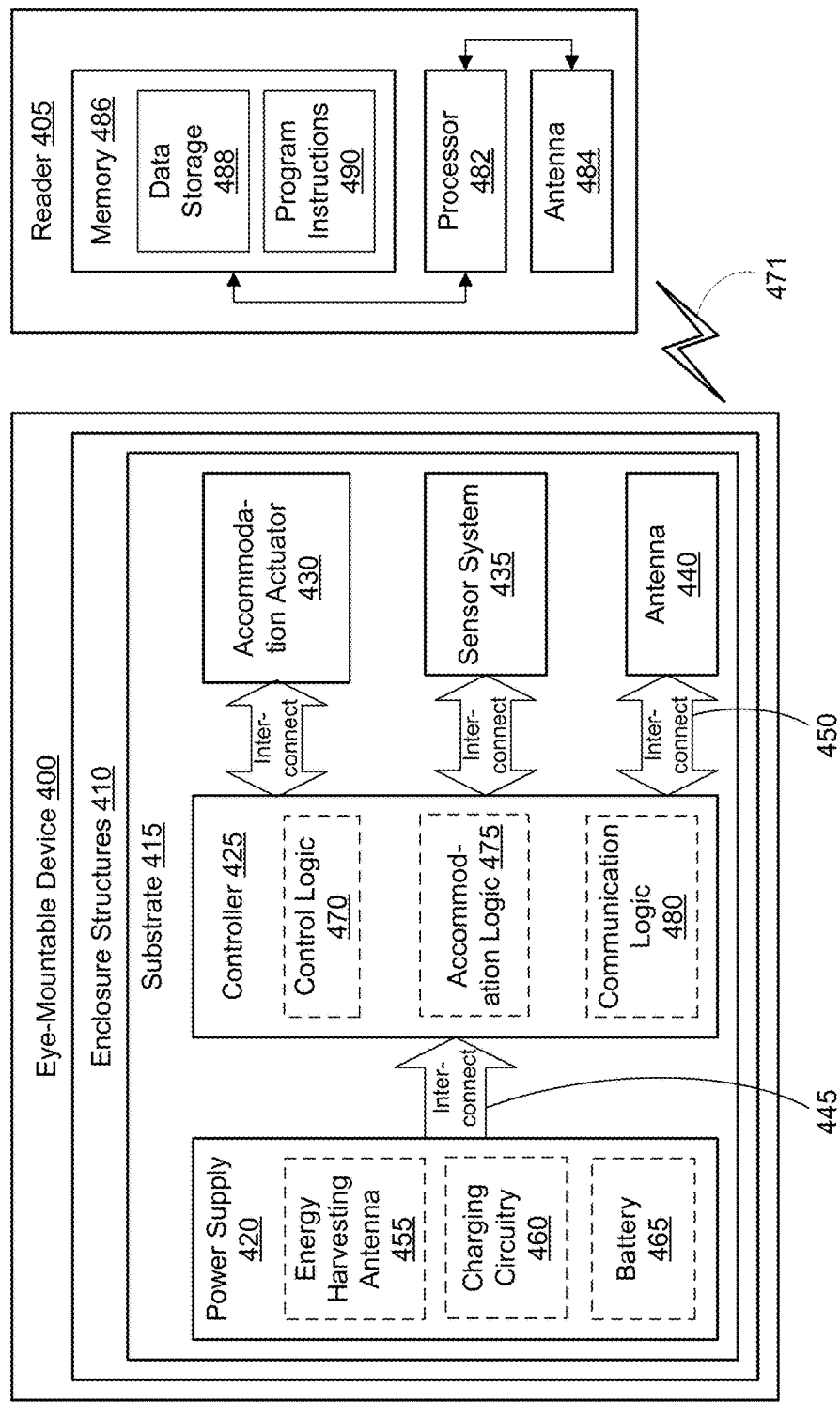
FIG. 4 is a functional block diagram of an eye-mountable device that provides auto-accommodation and an external reader for interacting with the eye-mountable device, in accordance with an embodiment.

FIG. 4 is a functional block diagram of an eye-mountable device (EMD) 400, in accordance with an embodiment of the disclosure, which provides auto-accommodation functionality along with an external reader 405. EMD 400 may include some or all of the features of EMD 300, for example. In an embodiment, fabrication of EMD 400 includes performance of method 200.

An exposed portion of EMD 400 may include enclosure structures 410 formed by lens portions of a lens that is to be contact-mounted to a corneal surface of an eye. In an embodiment, enclosure structures 410 include multiple lens portions that overlap one another and are coupled to one another by a flexible arm structure. Enclosure structures 410 may further comprise an encapsulation material that is disposed on (e.g., around) some or all of such multiple lens portions.

A substrate 415 may be embedded within or surrounded by enclosure structures 410 to provide a mounting surface for a power supply 420, a controller 425, a sensor system 435, an antenna 440, and various interconnects 445 and 450. An accommodation actuator 430 may be embedded within enclosure structures 410 and coupled to controller 425 to provide auto-accommodation to the wearer of EMD 400. The illustrated embodiment of power supply 420 includes an energy harvesting antenna 455, charging circuitry 460, and a battery 465. The illustrated embodiment of controller 425 includes control logic 470, accommodation logic 475, and communication logic 480. The illustrated embodiment of reader 405 includes a processor 482, an antenna 484, and memory 486.

Controller 425 may be coupled to receive feedback control signals from sensor system 435 and further coupled to operate accommodation actuator 430. Power supply 420 supplies operating voltages to the controller 425 and/or the accommodation actuator 430. Antenna 440 may be operated by the controller 425 to communicate information to and/or from EMD 400. In one embodiment, antenna 440, controller 425, power supply 420, and sensor system 435 are all situated on the embedded substrate 415. In one embodiment, accommodation actuator 430 is embedded within a center region of enclosure structures 410, but is not disposed on substrate 415. Because EMD 400 includes electronics and may be configured to be contact-mounted to an eye, it is also referred to herein as an ophthalmic electronics platform, a contact lens, or a smart contact lens.

To facilitate contact-mounting, the enclosure structures 410 may have a concave surface configured to adhere ("mount") to a moistened corneal surface (e.g., by capillary forces with a tear film coating the corneal surface). Additionally or alternatively, the EMD 400 may be adhered by a vacuum force between the corneal surface and enclosure structures 410 due to the concave curvature. While mounted with the concave surface against the eye, the outward-facing surface of enclosure structures 410 may have a convex curvature that is formed to not interfere with eye-lid motion while the EMD 400 is mounted to the eye. For example, enclosure structures 410 may form a substantially transparent curved disk shaped similarly to a contact lens.

Enclosure structures 410 may include one or more biocompatible materials, such as those employed for use in contact lenses or other ophthalmic applications involving direct contact with the corneal surface. Enclosure structures 410 may optionally be formed in part from such biocompatible materials or may include an outer coating with such biocompatible materials. Enclosure structures 410 may include materials configured to moisturize the corneal surface, such as hydrogels and the like. Enclosure structures 410 may be a semi-rigid material to enhance wearer comfort. In some instances, enclosure structures 410 may be shaped to provide a predetermined, vision-correcting optical power, such as can be provided by a contact lens. Enclosure structures 410 may be fabricated of various materials including a polymeric material, a hydrogel, PMMA, silicone based polymers (e.g., fluoro-silicon acrylate), or otherwise.

Substrate 415 may include one or more surfaces suitable for mounting sensor system 435, controller 425, power supply 420, and antenna 440. Substrate 415 may be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide or the flexible conductive materials discussed below) may be patterned on substrate 415 to form circuitry, electrodes, etc. For example, antenna 440 may be formed by depositing a pattern of gold or another conductive material on substrate 415. Similarly, interconnects 445 and 450 may be formed by depositing suitable patterns of conductive materials on substrate 415. A combination of resists, masks, and deposition techniques may be employed to pattern materials on substrate 415. Substrate 415 may be a relatively rigid material, such as polyethylene terephthalate ("PET") or another material sufficient to structurally support the circuitry and/or electronics within enclosure structures 410. EMD 400 may alternatively be arranged with a group of unconnected substrates rather than a single substrate. For example, controller 425 and power supply 420 may be mounted to one substrate, while antenna 440 and sensor system 435 are mounted to another substrate and the two may be electrically connected via interconnects.

Although certain embodiments are not limited in this regard, substrate 415 may be shaped as a flattened ring with a radial width dimension sufficient to provide a mounting platform for the embedded electronics components. Substrate 415 may have a thickness sufficiently small to allow the substrate to be embedded in enclosure structures 410 without adversely influencing the profile of EMD 400. Substrate 415 may have a thickness sufficiently large to provide structural stability suitable for supporting the electronics mounted thereon. For example, substrate 415 may be shaped as a ring with a diameter of about 10 millimeters, a radial width of about 0.5-1 millimeter (e.g., an outer radius 1 millimeter larger than an inner radius), and a thickness of about 50 micrometers. Substrate 415 may optionally be aligned with the curvature of the eye-mounting surface of EMD 400 (e.g., convex surface). For example, substrate 415 may be shaped along the surface of an imaginary cone between two circular segments that define an inner radius and an outer radius. In such an example, the surface of substrate 415 along the surface of the imaginary cone defines an inclined surface that is approximately aligned with the curvature of the eye mounting surface at that radius.

In some embodiments, power supply 420 and controller 425 (and the substrate 415) may be positioned away from the center of EMD 400 and thereby avoid interference with light transmission to the eye through the center of EMD 410. In contrast, accommodation actuator 430 may be centrally positioned to apply optical accommodation to the light transmitted to the eye through the center of enclosure structures 410. For example, where EMD 400 is shaped as a concave-curved disk, substrate 415 may be embedded around the periphery (e.g., near the outer circumference) of the disk. In some embodiments, sensor system 435 includes one or more discrete capacitance (or other) sensors that are peripherally distributed to sense the eyelid overlap.

In the illustrated embodiment, power supply 420 includes a battery 465 to power the various embedded electronics, including controller 425. Battery 465 may be inductively charged by charging circuitry 460 and energy harvesting antenna 455. In one embodiment, antenna 440 and energy harvesting antenna 455 are independent antennae, which serve their respective functions of energy harvesting and communications. In another embodiment, energy harvesting antenna 455 and antenna 440 are the same physical antenna that are time shared for their respective functions of inductive charging and wireless communications with reader 405.

Controller 425 may include logic to choreograph the operation of the other embedded components. Control logic 470 controls the general operation of EMD 400, including providing a logical user interface, power control functionality, etc. Accommodation logic 475 includes logic for monitoring feedback signals from sensor system 435, determining the current gaze direction or focal distance of the user, and manipulating accommodation actuator 430 in response to provide the appropriate accommodation. The auto-accommodation may be implemented in real-time based upon feedback from the gaze tracking, or permit user control to select specific accommodation regimes (e.g., near-field accommodation for reading, far-field accommodation for regular activities, etc.). Communication logic 480 may provide a communication protocol for wireless communication with reader 405 via antenna 440. In one embodiment, communication logic 480 provides backscatter communication via antenna 440 when in the presence of an electromagnetic field 471 output from reader 405. In one embodiment, communication logic 480 operates as a smart wireless radio-frequency identification ("RFID") tag that modulates the impedance of antenna 440 for backscatter wireless communications. The various logic modules of controller 425 may be implemented in software/firmware executed on a general purpose microprocessor, in hardware (e.g., application specific integrated circuit), or a combination of both.

EMD 400 may include various other embedded electronics and logic modules. For example, a light source or pixel array may be included to provide visible feedback to the user. An accelerometer or gyroscope may be included to provide positional, rotational, directional or acceleration feedback information to controller 425.

Figure 5A:
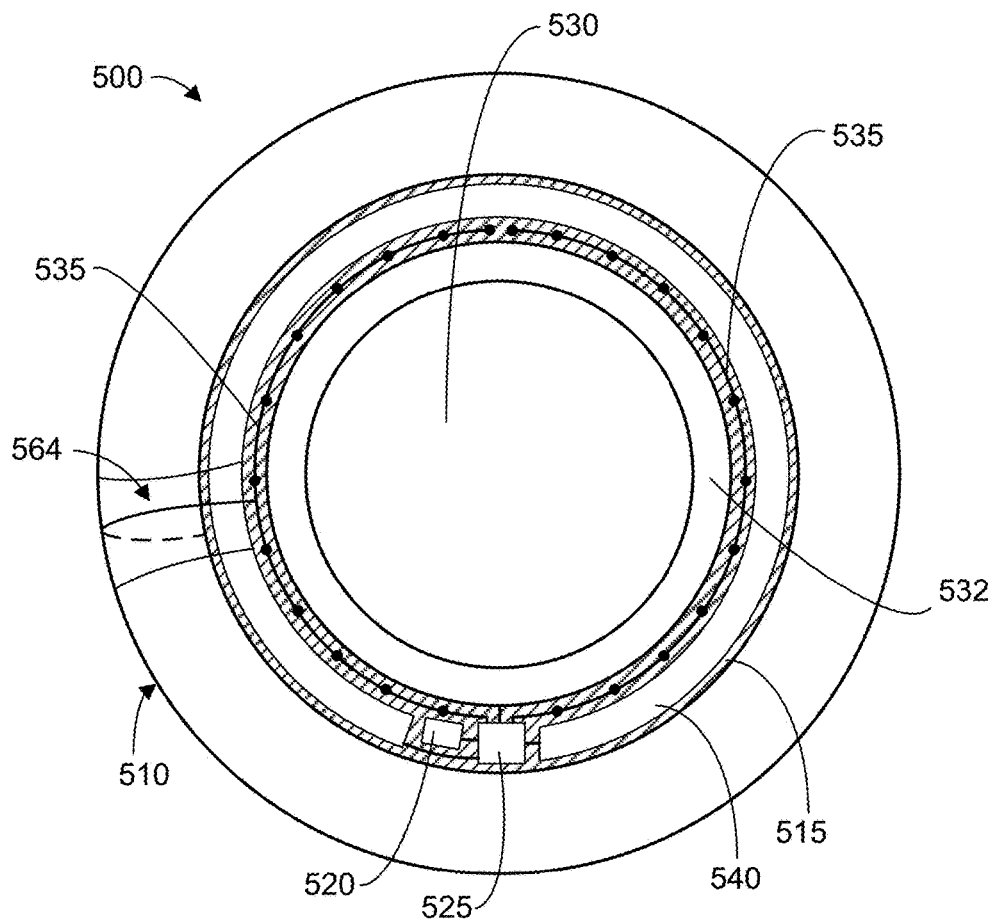
FIG. 5A is a top view illustration of an eye-mountable device, in accordance with an embodiment.
Figure 5B:
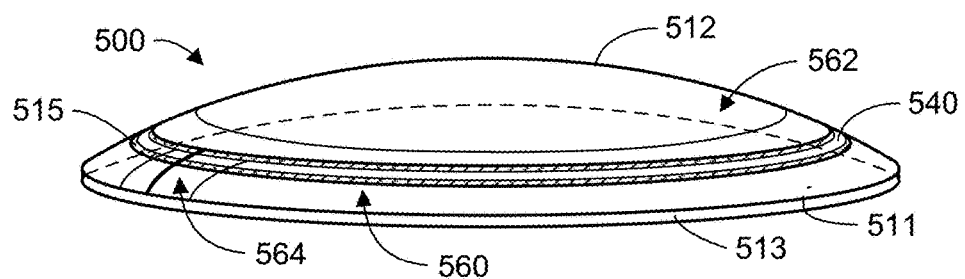
FIG. 5B is a perspective view illustration of an eye-mountable device, in accordance with an embodiment.

FIGS. 5A and 5B illustrate two views of an EMD 500, in accordance with an embodiment of the disclosure. EMD 500 may include some or all of the features of one or EMDs 300, 400, for example. In an embodiment, fabrication of EMD 500 includes performance of method 200.

FIG. 5A is a top view of EMD 500 while FIG. 5B is a perspective view of the same. EMD 500 is one possible implementation of EMD 400 illustrated in FIG. 4. The illustrated embodiment of EMD 500 includes a lens 510, a ring substrate 515, a power supply 520, a controller 525, an accommodation actuator 530, a capacitive sensor system 535, and an antenna 540. It should be appreciated that FIGS. 5A and 5B are not necessarily drawn to scale, but have been illustrated for purposes of explanation only in describing the arrangement of the example EMD 500.

Lens 510 of EMD 500 may be shaped as a curved disk. Lens 510 may be formed by lens portions 560, 562 that overlap one another and are coupled to one another by a flexible arm structure 564. One side of lens 510 may have a concave surface 511 suitable to fit over a corneal surface of an eye. The opposite side of the disk has a convex surface 512 that does not interfere with eyelid motion while EMD 500 is mounted to the eye. In the illustrated embodiment, a circular or oval outer side edge 513 connects the concave surface 511 and convex surface 512.

EMD 500 may have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of EMD 500 are selected according to the size and/or shape of the corneal surface of the wearer's eye. Lens 510 may be formed with lens portions having respective curved shapes that are manufactured in any of a variety of ways. For example, techniques similar to those employed to form vision-correction contact lenses, such as heat molding, injection molding, spin casting, etc. may be employed to form such curved lens portions.

Ring substrate 515 may be embedded within an enclosure formed in lens 510. Ring substrate 515 may be embedded to be situated along the outer periphery of lens 510, away from the central region where accommodation actuator 530 is positioned. In the illustrated embodiment, ring substrate 515 encircles accommodation actuator 530. Ring substrate 515 does not interfere with vision because it is too close to the eye to be in focus and is positioned away from the central region where incident light is transmitted to the light-sensing portions of the eye. In some embodiments, ring substrate 515 may optionally be formed of a transparent material to further mitigate effects on visual perception. Ring substrate 515 may be shaped as a flat, circular ring (e.g., a disk with a centered hole). The flat surface of ring substrate 515 (e.g., along the radial width) may be a platform for mounting electronics and for patterning conductive materials to form electrodes, antenna(e), and/or interconnections.

Capacitive sensor system 535 may be distributed about EMD 500 to sense eyelid overlap in a manner similar to capacitive touch screens. By monitoring the amount and position of eyelid overlap, feedback signals from capacitive sensor system 535 may be measured by controller 525 to determine the approximate gaze direction and/or focal distance. In the illustrated embodiment, capacitive sensor system 535 is formed by a series of parallel coupled discrete capacitive elements. Capacitive sensor system 535 is merely one example of a sensor system to detect gaze direction. However, other implementations may be used. For example, other embodiments may include more, fewer and/or differently arranged capacitive sensors and/or may include any of various additional or alternative types of mechanisms to detect gaze direction.

Accommodation actuator 530 may be centrally positioned within lens 510 to affect the optical power of EMD 500 in the user's center of vision. A pinch-off region 532 (e.g., formed by ring structures of curved lens portions 560, 562) may be disposed between accommodation actuator 530 and ring substrate 515 to provide electrical isolation from at least some circuitry of ring substrate 515. In various embodiments, accommodation actuator 530 includes an element that changes its index of refraction under the influence of flexible conductive electrodes manipulated by controller 525. By changing its refractive index, the net optical power of the curved surfaces of EMD 500 may be altered, thereby applying controllable accommodation. Accommodation actuator 530 may be implemented using a variety of different optoelectronic elements. For example, accommodation actuator 530 may be implemented using a layer of liquid crystal (e.g., a LC cell) disposed in the center of lens 510. In other embodiments, accommodation actuator 530 may be implemented using other types of electro-active optical materials such as electro-optic materials that vary refractive index in the presence of an applied electric field. Accommodation actuator 530 may be a distinct device embedded within lens 510 (e.g., LC cell), or a bulk material having a controllable refractive index. In yet another embodiment, accommodation actuator 530 may be implemented using a deformable lens structure that changes shape under the influence of an electrical signal. Accordingly, the optical power of EMD 500 may be controlled by controller 525 with the application of electric signals via one or more electrodes extending from controller 525 to accommodation actuator 530.

Figure 6:
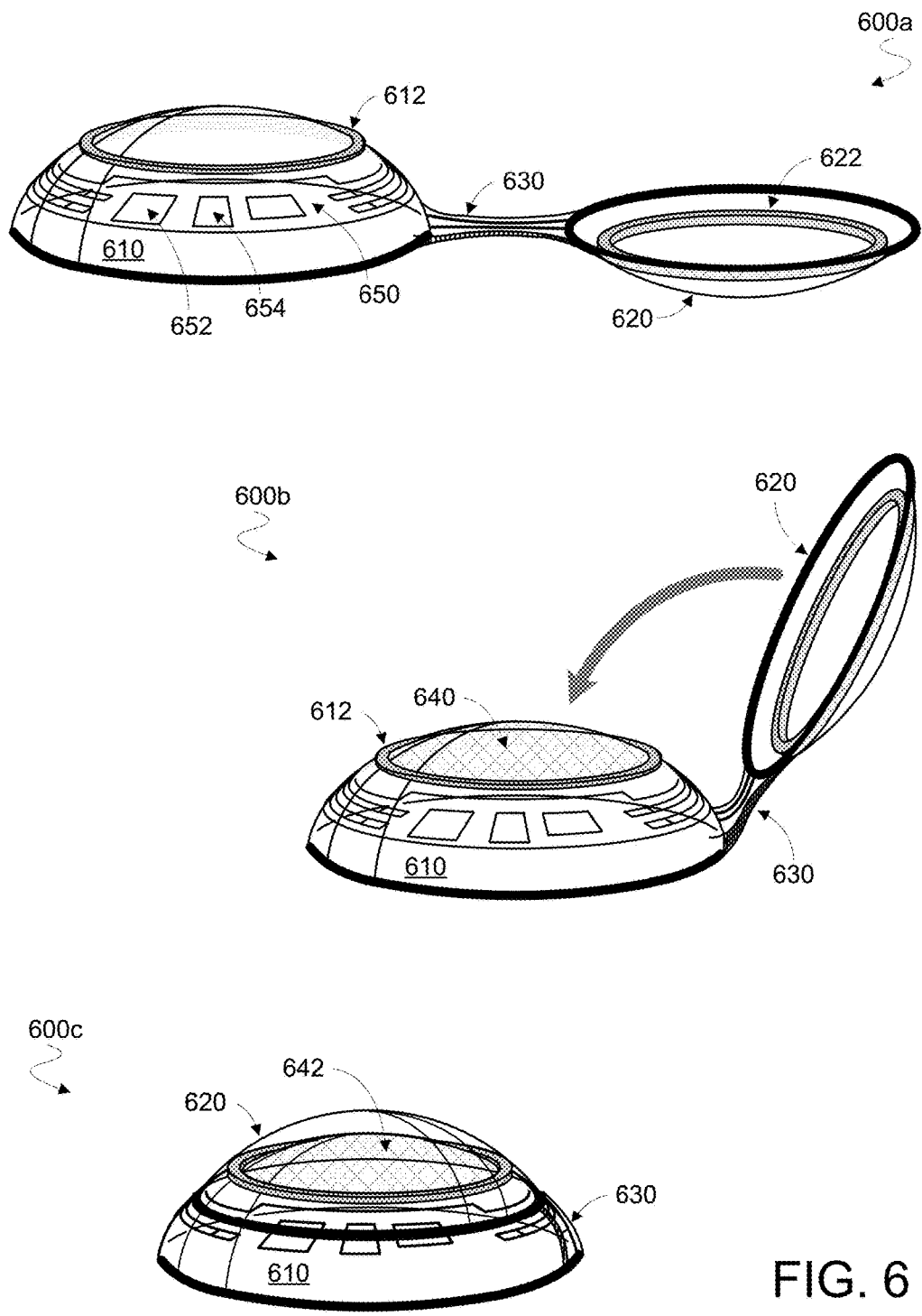
FIG. 6 shows perspective views of a process to fabricate an eye-mountable device according to an embodiment.

FIG. 6 shows in perspective view various stages 600a, 600b, 600c of processing to fabricate an EMD, in accordance with an embodiment of the disclosure. Such processing may include that represented, for example, by stages 100a, 100b, 100c, 100d. Alternatively or in addition, such processing may include performing method 200. The processing represented in FIG. 6 may fabricate a device having some or all of the features of one of EMDs 300, 400, 500.

As shown by stage 600a, a device according to one embodiment includes curved lens portions 610, 620 and a flexible arm structure 630 that extends between each of curved lens portion 610, 620. Structures variously formed in or on curved lens portions 610, 620 may include one or more components of an accommodation actuator or may facilitate the positioning and/or operation of such one or more components. By way of illustration and not limitation, curved lens portions 610, 620 may form—or have formed thereon—respective ring structures 612, 622 that each encircle a surface area of a corresponding one of curved lens portions 610, 620. Ring structures 612, 622 may aid in constraining or otherwise locating a LC cell in an enclosure that is to be formed with curved lens portions 610, 620. Other structures formed in or on curved lens portions 610, 620 may include, for example, a ring substrate 650, a power supply 652, controller circuit 654 and electrodes (not shown) to variously facilitate electrical connection between some or all such structures.

As shown by stage 600b, a LC material 640 may be disposed on the surface region that is encircled or otherwise defined at least in part by ring structure 612. Formation of LC layer 640 may include spraying, jetting, precision drop dispense, spinning, masking, stenciling, and/or other operations adapted from conventional fabrication techniques. LC layer 640 may comprise, for example, poly(3,4-ethylenedioxythiophene):poly(styrenesulfonate) (or PEDOT:PSS) or any of various other liquid crystals that provide for variable refractive index characteristics. In an embodiment, LC layer 640 is isolated electrically from at least some circuitry of ring substrate 650. Additionally or alternatively, LC layer 640 eventually may be disposed between electrodes formed on different respective ones of curved lens portions 610, 620.

After curved lens portions 610, 620 are positioned to overlap each other, LC material 640 may be sealed in a central region of the EMD. For example, arm structure 630 may be folded, twisted and/or otherwise deformed to cause curved lens portions 610, 620 to overlap each other—e.g., for formation of at least part of a composite lens of the EMD. In one embodiment, curved lens portions 610, 620 have variously formed thereon respective fiducial markers—e.g., wherein alignment of curved lens portions 610, 620 with each other is made with reference to such fiducial markers.

Deformation of arm structure 630 and manipulation of curved lens portions 610, 620 may bring ring structures 612, 622 into contact with one another to form at least in part a sealed LC cell 642 disposed within an enclosure formed by a lens. In addition to LC material 640, the sealed LC cell 642 may further comprise one or more alignment layers (not shown) adjoining LC material 640—e.g., where two alignment layers are encircled each by a different respective one of ring structures 612, 622. Collectively, the LC cell 642 may function as an accommodation actuator that is manipulated under the influence of controller circuit 654. Some or all such electrodes may electrically manipulate LC cell 642 via the application of a voltage across the electrodes.

FIG. 7 shows stages 700a, 700b of processing to fabricate an EMD according to another embodiment. Such processing may include that represented, for example, by one of FIGS. 1 and 6. Alternatively or in addition, such processing may include operations of method 200. The processing represented in FIG. 6 may fabricate a device having some or all of the features of one of EMDs 300, 400, 500.

As shown by stage 700a, a device according to one embodiment includes curved lens portions 710, 720 and a flexible arm structure 730 that extends between, and is anchored to each of, curved lens portion 710, 720. For example, the device may include ring structures 712, 714 that extent each around the periphery of a respective one of curved lens portions 710, 720. Distal ends of arm structure 730 may be coupled each to a respective one of such ring structures 712, 714.

In the illustrative embodiment shown in FIG. 7, an EMD is formed at least in part at stage 700b by twisting arm structure 730 in order to overlap curved lens portions 710, 720 with each other. For example, a side of curved lens portion 710 that is shown at stage 700b may be obverse to the side of curved lens portion 710 shown at stage 700a. In such an embodiment, a structure 714 formed in or on curved lens portion 710 may be flipped and moved to overlap another structure 724 formed in or on curved lens portion 720.

Structures 714, 724 may be brought into contact with one another—e.g., to facilitate electrical connection between circuitry disposed on curved lens portion 710 and other circuitry disposed on curved lens portion 720. In some embodiments, additional or alternative circuitry variously disposed in or on respective ones of curved lens portions 710, 720 may be electrically interconnected via one or more signal traces (not shown) that extend in or on arm structure 730.

In some embodiments, an EMD may be formed by a device that includes three or more curved lens portions and multiple flexible arm structures each coupled between a respective pair of such curved lens portions. An example of one such device is represented by the device 800 shown in FIG. 8. In the illustrative embodiment shown, device 800 includes curved lens portions 810, 820, 840 and flexible arm structures 830, 850. Arm structure 830 may be anchored to each of curved lens portions 810, 820—e.g., by branch structures 832, 834 variously extending in or on curved lens portions 810, 820, respectively. Alternatively or in addition, arm structure 850 may be anchored by branch structures 832, 834 extending in or on curved lens portions 810, 840, respectively.

Formation of an EMD with device 800 may include variously deforming arm structures 830, 850 to overlap curved lens portions 810, 820, 840 with one another. For example, a structure 822 disposed in or on curved lens portion 820 may be aligned with (and in some embodiments, brought into contact with) a structure 842 disposed in or on curved lens portion 810. Alternatively or in addition, another structure 842 disposed in or on curved lens portion 840 may be aligned with (and in some embodiments, brought into contact with) one of structures 812, 822. In such an embodiment, a compact lens of the EMD may include a stacked configuration of curved lens portions 810, 820, 840.

The techniques described herein may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus comprising:
   a first curved lens portion;
   a second curved lens portion;
   a third curved lens portion, wherein the first curved lens portion, the second curved lens portion, and the third curved lens portion are configured to form at least part of a lens of an eye-mountable device;
   a first arm structure that extends between the first curved lens portion and the second curved lens portion, wherein a flexibility of the first arm structure is greater than a flexibility of at least one of the first curved lens portion or the second curved lens portion, and wherein the first arm structure is configured to be deformed to overlap the first curved lens portion with the second curved lens portion; and
   a second arm structure that extends between the first curved lens portion and the third curved lens portion, wherein a flexibility of the second arm structure is greater than a flexibility of at least one of the first curved lens portion or the third curved lens portion, and wherein the second arm structure is configured to be deformed to overlap the first curved lens portion with the third curved lens portion.

2. The apparatus of claim 1, further comprising a first structure disposed in or on the first curved lens portion and a second structure disposed in or on the second curved lens portion, wherein the first arm structure is configured to be deformed to enable the first structure to contact the second structure.

3. The apparatus of claim 2, wherein the first structure includes a first electrode and the second structure includes a second electrode.

4. The apparatus of claim 1, further comprising:
   first circuitry disposed in or on the first curved lens portion; and
   second circuitry disposed in or on the second curved lens portion, wherein the first circuitry is coupled to the second circuitry via one or more signal traces disposed in or on the first arm structure.

5. The apparatus of claim 1, wherein a ring structure is formed by the first curved lens portion or is disposed on the first curved lens portion, wherein the ring structure encircles an area at a surface of the first curved lens portion.

6. The apparatus of claim 5, wherein the ring structure includes a lip structure or a groove structure.

7. The apparatus of claim 1, further comprising fiducial markers each disposed in or on a different respective one of the first curved lens portion and the second curved lens portion, the fiducial markers to facilitate an alignment of the first curved lens portion with the second curved lens portion.

8. The apparatus of claim 1, wherein a diameter of the first curved lens portion is larger than a diameter of the second curved lens portion.

9. An eye-mountable device (EMD) comprising:
   a first curved lens portion;
   a second curved lens portion which overlaps and is sealed to the first curved lens portion;
   a third curved lens portion which overlaps the first curved lens portion and the second curved lens portion and which is sealed to the first curved lens portion, wherein the first curved lens portion, the second curved lens portion, and the third curved lens portion form at least part of a lens of the eye-mountable device;
   a first arm structure anchored to the first curved lens portion and to the second curved lens portion, wherein a flexibility of the first arm structure is greater than a flexibility of at least one of the first curved lens portion or the second curved lens portion, and wherein the first arm structure is deformed to overlap the first curved lens portion with the second curved lens portion;
   a second arm structure anchored to the first curved lens portion and to the third curved lens portion, wherein a flexibility of the second arm structure is greater than a flexibility of at least one of the first curved lens portion or the third curved lens portion, and wherein the second arm structure is deformed to overlap the first curved lens portion with the third curved lens portion; and an accommodation actuator element disposed across a central region of an enclosure formed with the lens, wherein the accommodation actuator element is disposed between the first curved lens portion and the second curved lens portion within the central region.

10. The EMD of claim 9, further comprising a first electrode at a surface of the first curved lens portion and a second electrode at a surface of the second curved lens portion, wherein the first electrode is in contact with the second electrode.

11. The EMD of claim 9, further comprising:
first circuitry disposed in or on the first curved lens portion; and
second circuitry disposed in or on the second curved lens portion, wherein the first circuitry is coupled to the second circuitry via one or more signal traces disposed in or on the first arm structure.

12. The EMD of claim 9, wherein the accommodation actuator includes a liquid crystal cell disposed within a ring structure that is formed by the first curved lens portion or is disposed on the first curved lens portion.

13. The EMD of claim 9, wherein a diameter of the first curved lens portion is larger than a diameter of the second curved lens portion.

* * * * *